United States Patent [19]

Tamori

[11] Patent Number: 5,503,029
[45] Date of Patent: Apr. 2, 1996

[54] SURFACE PRESSURE INPUT PANEL

[75] Inventor: Teruhiko Tamori, Saitama, Japan

[73] Assignee: Enix Corporation, Tokyo, Japan

[21] Appl. No.: 320,190

[22] Filed: Oct. 7, 1994

[30] Foreign Application Priority Data

Oct. 8, 1993 [JP] Japan .................................. 5-277619

[51] Int. Cl.$^6$ .................................................. G06K 9/00
[52] U.S. Cl. ................... 73/862.046; 73/862.041
[58] Field of Search ....................... 73/862.041, 862.046, 73/865.7; 382/4, 5

[56] References Cited

U.S. PATENT DOCUMENTS

| | | | |
|---|---|---|---|
| 4,014,217 | 3/1977 | Lagasse et al. | 73/432 R |
| 4,547,898 | 10/1985 | Tsikos | 382/4 |
| 4,577,345 | 3/1986 | Abramov | 382/4 |
| 4,640,137 | 2/1987 | Trull et al. | 73/865.7 |
| 5,010,774 | 4/1991 | Kikuo et al. | 73/862.046 |
| 5,055,838 | 10/1991 | Wise et al. | 73/862.046 |
| 5,060,527 | 10/1991 | Burgess | 73/865.7 |
| 5,083,467 | 1/1992 | Tabota | 73/862.046 |
| 5,225,959 | 7/1993 | Stearns | 361/283 |

FOREIGN PATENT DOCUMENTS

| | | | |
|---|---|---|---|
| 0465231A3 | 7/1991 | European Pat. Off. | G06K 11/12 |
| 0566336A2 | 4/1993 | European Pat. Off. | G01L 1/12 |
| 0568343A1 | 4/1993 | European Pat. Off. | H03K 17/96 |

*Primary Examiner*—Richard Chilcot
*Assistant Examiner*—Ronald Biegel
*Attorney, Agent, or Firm*—Townsend and Townsend and Crew

[57] ABSTRACT

An active matrix surface pressure input panel comprises a flexible pressure sheet stacked onto a circuit base plate. The pressure sheet includes a conductive layer and the circuit base plate comprises an insulating plate with first and second groups of intersecting electrode lines and a multiplicity of detection elements formed thereon. Each detection element includes a contact plate coupled to the electrode lines by a switch, such as a thin film transistor or diode, and configured to generate an electrical signal when the overlying portion of the conductive layer contacts the contact plate. The electrode lines are coupled to an electrical circuit that determines the relative location of each electrical signal to map an overall surface pressure distribution. With this configuration, the surface pressure input panel exhibits high definition over a relatively large detection area so that complicated surfaces, such as fingerprints, can be accurately detected and reproduced.

19 Claims, 5 Drawing Sheets

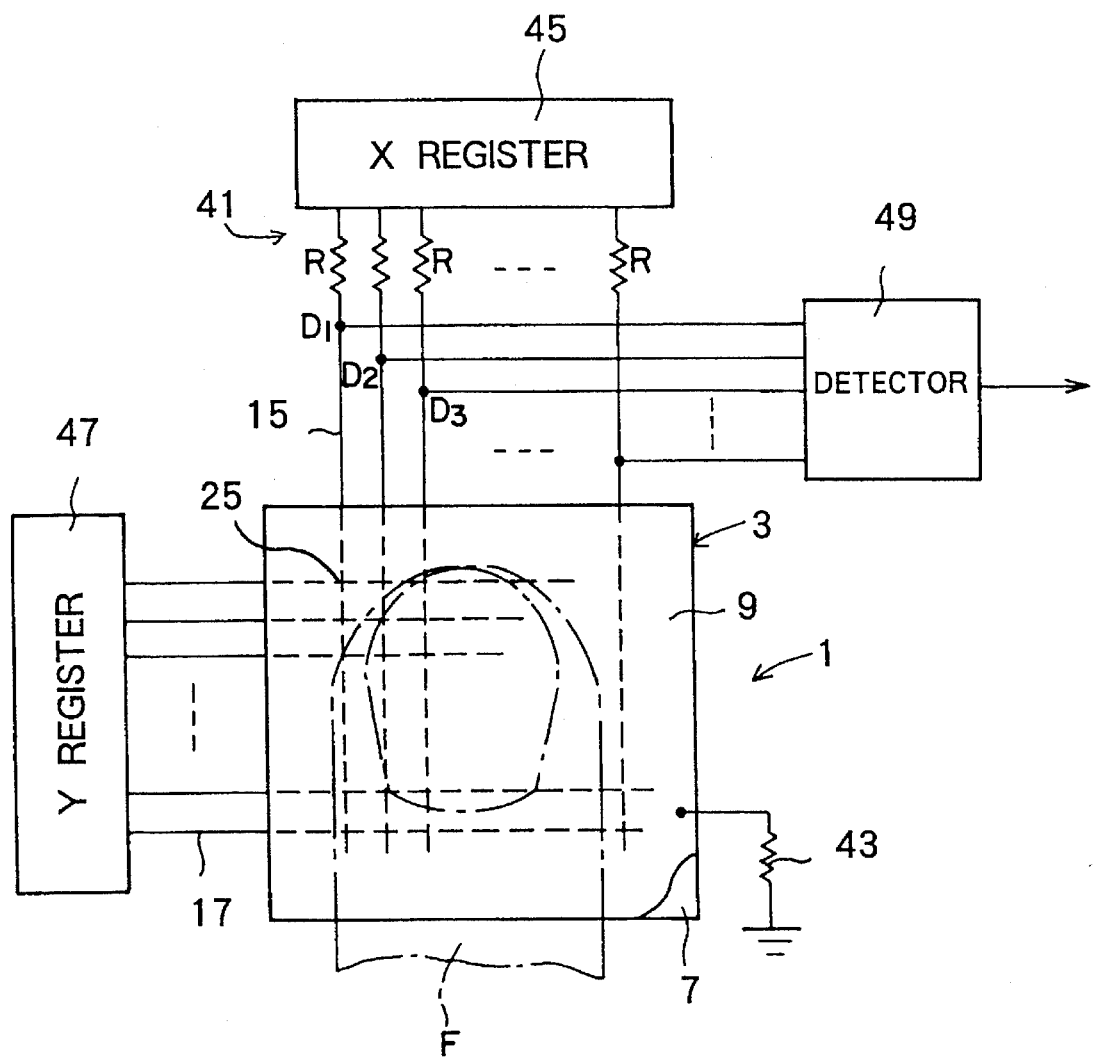
F I G. 4

SURFACE PRESSURE INPUT PANEL

FIELD OF THE INVENTION

This invention relates to surface pressure input panels generally and more specifically to an active matrix type surface pressure input panel suitable for detecting complicated surface contours and irregularities such as a fingerprint pattern.

BACKGROUND OF THE INVENTION

The inside surface of the fingertip has intricate contours that are unique to each individual. This has made the fingerprint pattern an important vehicle for identification, particularly for law enforcement purposes. To facilitate identification via fingerprints, efforts have been made to develop fingerprint detection devices capable of electronically mapping an individual fingerprint pattern. Accurately mapping the contour of each person's fingertip, however, has proven to be a difficult and expensive task. This is because each fingerprint pattern is made up of a large number of convex portions, or ridges, separated by concave portions or grooves that generally extend in random directions around the fingertip. These ridges and grooves have minute dimensions, on the order of 100 μm, making them difficult to detect.

Conventional fingerprint detection devices generally employ a surface pressure input panel that includes a contact sheet that changes in some manner when it is engaged by the various ridges and grooves of the fingertip. One such device comprises a conductive rubber sheet that undergoes local variations in conductivity when engaged by a surface with a pressure differential. Similar devices include a resistive film that varies in resistance with changes in surface pressure. These devices employ a means for detecting the changes in the contact sheet or film in order to electronically map the contour of the fingertip. The detection means, however, typically has difficulty detecting small pressure changes, particularly when a non-uniform pressing force is applied or the fingertip is contaminated with grease, sweat or the like. Therefore, these devices are often incapable of accurately detecting the small surface variations necessary for mapping the contour of a fingertip.

Other fingerprint detection devices have attempted to overcome this problem by employing MOS field-effect transistors or piezoelectric thin films to detect small surface variations. These devices, however, generally require complicated manufacturing techniques and relatively expensive materials, such as silicon semiconductor substrates. Although these devices can produce high definition, they are difficult to manufacture and, therefore, are very expensive. Accordingly, manufacturing these devices to map a large detection area, such as a fingerprint pattern (which is very large compared to the size of the individual surface changes or irregularities) is not presently feasible.

SUMMARY OF THE INVENTION

The present invention is directed to an inexpensive surface pressure panel capable of detecting complicated surface contours such as a fingerprint pattern. To accomplish this, the invention comprises a surface pressure input panel having a flexible pressure sheet coupled to a circuit base plate. The pressure sheet includes a conductive layer adapted to conform to surface contours and the circuit base plate comprises an insulating plate with appropriate electrode lines formed thereon. The circuit base plate further includes a multiplicity of detection elements, each including a conductive contact plate distributed over the area of the board, facing the conductive layer and coupled to the electrode lines. Each detection element is configured to generate an electric signal when the conductive layer contacts a portion of the contact plate. The electrode lines are preferably arranged in an XY grid and they are electrically coupled with the detection element so that the generated signal can be detected and the location of each contact plate can be determined.

In a preferred configuration, the surface pressure input panel is an active matrix type array having first and second (e.g. X and Y) groups of electrode lines intersecting each other at intersection points to form a matrix pattern on the circuit base plate. A detection element at each intersection point includes a contact plate and a switch coupling the contact plate to the electrode lines. Each detection element is configured so that an electrical signal can be generated that is preferably proportional to the area of the contact plate that has been engaged by the conductive layer. In this manner, the input panel can generate a plurality of different electric signals that are representative of the varying degrees of contact between the conductive layer and the contact plate as a result of variations in the pressure, e.g. due to surface variations (ridges and grooves) of a fingerprint.

When installed, the pressure input panel of the invention is coupled to X and Y registers which cycle through the groups of electrode lines so that a detector can correlate the generated electrical signal to the location of the detection units from which they emanate. The electrical signals are then appropriately processed so that the contour of the fingertip can be reproduced. With this configuration, the invention provides a relatively inexpensive surface pressure input panel that exhibits high definition over a relatively large detection area so that extremely complicated surfaces, such as fingerprints, can be accurately detected and reproduced.

In one embodiment, the contact plates are coupled to the electrode lines by thin film transistors (TFT's) of the type widely used for driving liquid crystal displays and which are readily available and inexpensive. Each such transistor has its drain terminal coupled to the first group of electrode lines, its gate terminal coupled to the second group of electrode lines and its source terminal coupled to the contact plate. When the conductive layer contacts a contact plate, a drain current, which is proportional to the area of the contact plate which has been contacted, flows through the corresponding line of the first group of electrode lines where it can be sensed by the detector.

In another embodiment, the circuit base plate has a pair of contact plates disposed adjacent to each intersection point. One of the contact plates is electrically coupled to the first group of electrode lines by a thin-film diode and the other contact plate is directly coupled to the corresponding line of the second group of electrode lines. When the conductive layer contacts the contact plates, the diode conducts current in the forward direction for sensing by the detector.

BRIEF DESCRIPTION OF THE DRAWINGS

FIG. 4 is a schematic of a circuit for detecting a fingerprint pattern coupled to the surface pressure input panel of FIG. 1;

DESCRIPTION OF THE PREFERRED EMBODIMENT

Referring to FIGS. 1–4, wherein like numerals indicate like elements, a surface pressure input panel 1 constructed according to the present invention generally includes a pressure sheet 3 stacked onto a circuit base plate 5 for detecting the surface pressure differentials across the pressure sheet.

Figure 1:
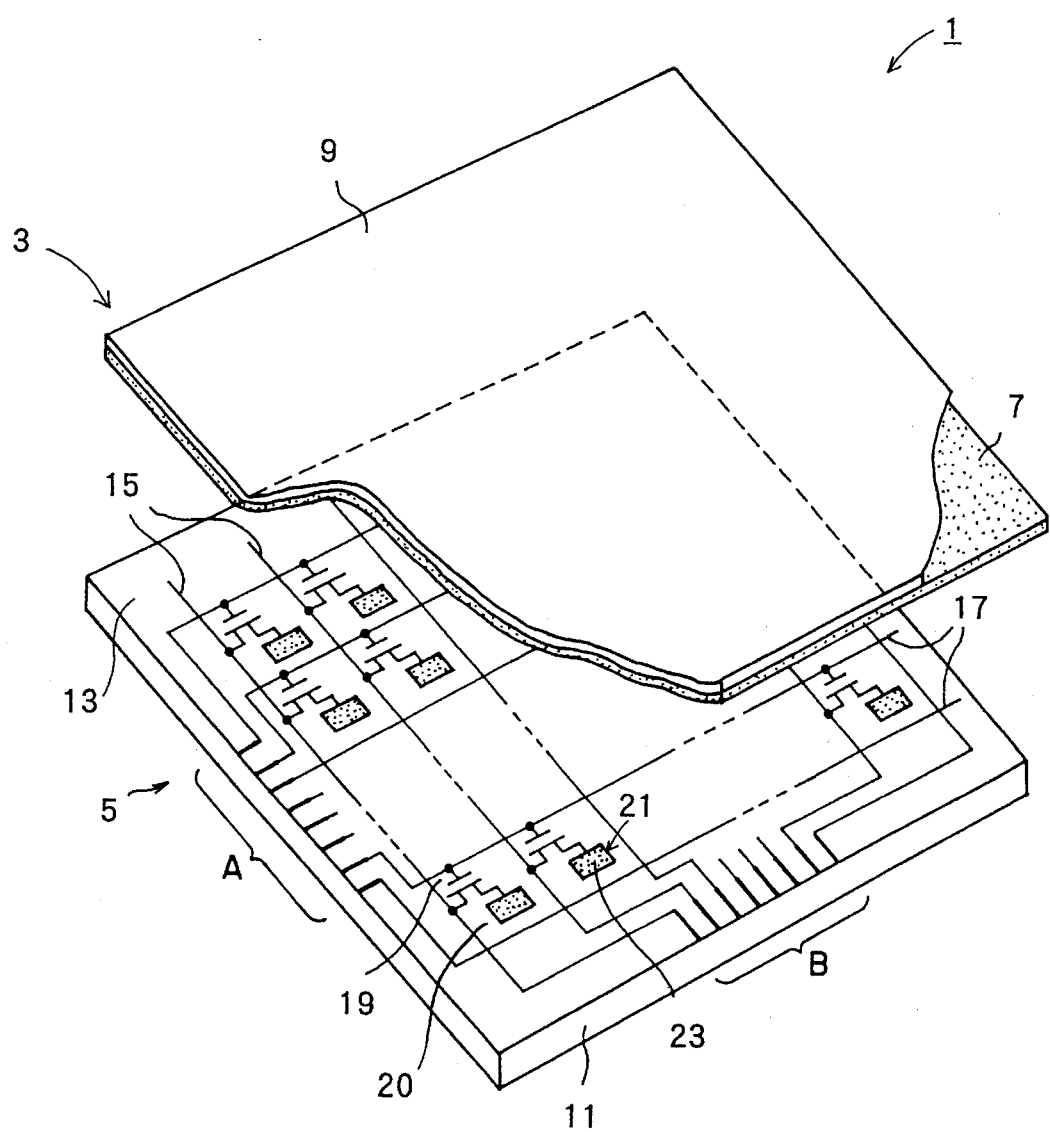
FIG. 1 is an exploded perspective view of a surface pressure input panel according to the principles of the present invention.

Pressure sheet 3 is formed by depositing a conductive layer 7 on the lower (as seen in FIG. 1) surface of an insulating film 9. Pressure sheet 3 is constructed so that it (i.e both the insulating film 9 and the conductive layer 7) will substantially conform to the contours and surface irregularities of an object that is pressed against it, such as the fingerprint pattern on the inside surface of a fingertip. Insulating film 9 serves to insulate the user's fingertips from the conductive layer 7 and preferably comprises a conventional insulating material such as polyethylene terephthalate (PET).

Circuit base plate 5 comprises an insulating plate 11 which may be made of a glass or ceramic material, for example. An amorphous silicon coating 13 on the upper surface of the insulating plate, preferably applied by a conventional photolithographic technique, forms a plurality of parallel electrode drain lines 15, electrode gate lines 17 arranged perpendicular to drain lines 15 and thin-film transistors 19 (TFT's) at each intersection between them. Drain lines 15 and gates lines 17 are gathered on edges A, B, respectively, of plate 11 and connected to external circuits via connectors (not shown). Drain lines 15 and gate lines 17 function as scanning electrode lines upon application of a scanning signal, as described in greater detail below.

Drain lines 15 and gate lines 17 define between them generally rectangular areas 20 for detection elements 21. Each detection element 21 includes a conductive contact plate 23 formed on circuit base plate 5, preferably by vapor deposition. Contact plates 23 may be constructed with a variety of conventional materials, such as indium tin oxide, for example. Each detection element 21 further includes one of the aforementioned thin-film transistors 19 that electrically couples contact plates 23 to drain lines 15 and gate lines 17. Transistors 19 are preferably polycrystal transistors as used for driving liquid crystal electrodes because they are reliable and relatively inexpensive to manufacture. However, a variety of other conventional transistors may be used in conjunction with the present invention.

Figure 2:
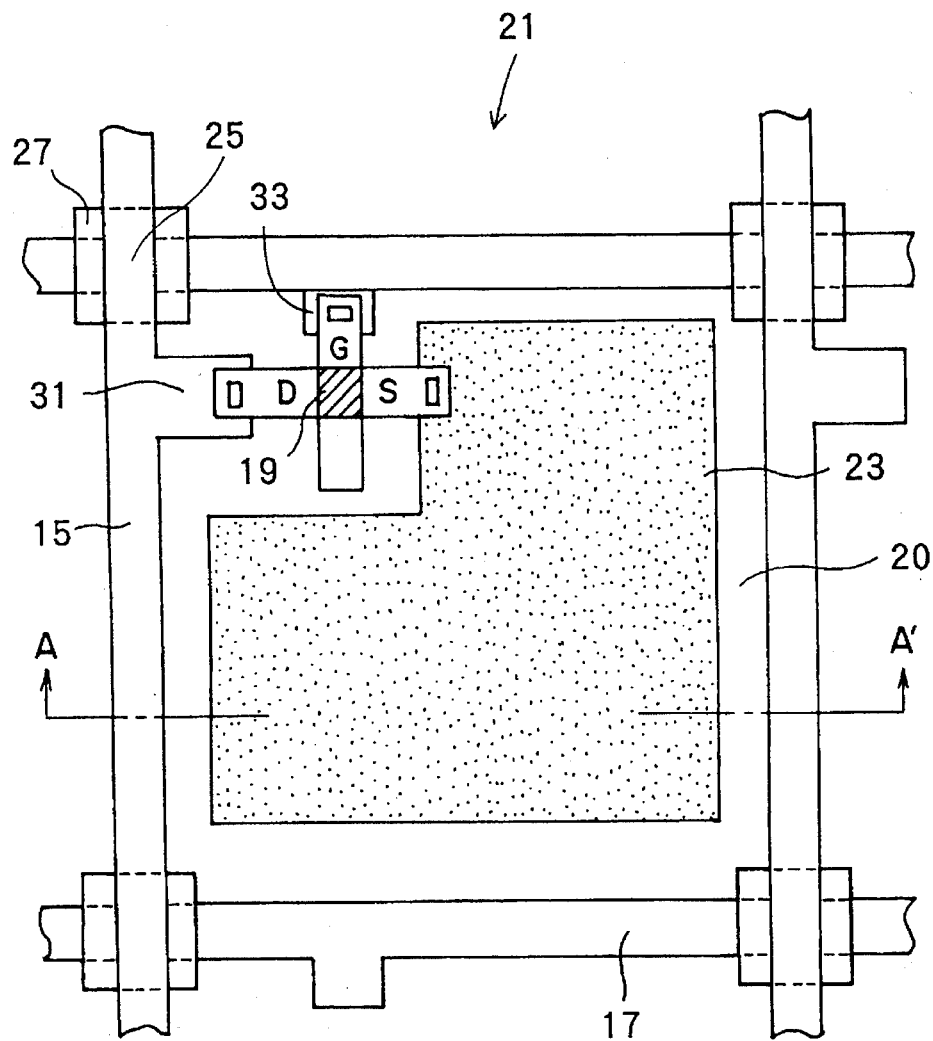
FIG. 2 is a enlarged view of a detection element formed on a circuit base plate of the surface pressure input panel of FIG. 1.
Figure 3:
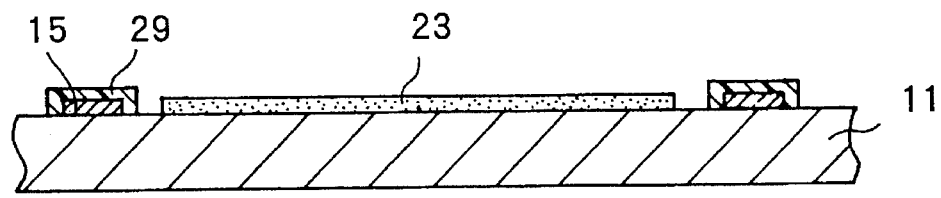
FIG. 3 is a side cross-sectional view of the detection element of FIG. 2.

FIG. 2 illustrates in greater detail a detection element 21 formed on circuit base plate 5 of surface pressure input panel 1. Each drain line 15 intersects with one of the gate lines 17 at an intersection point 25. An insulating spacer 27 is formed at each intersection point 25 between gate lines 15 and drain lines 17 to insulate the electrode lines from each other. Preferably, insulating spacer 27 is an $SiO_2$ film formed by conventional techniques such as vapor deposition. As shown in FIG. 3, each drain line 17 is also coated with an insulating coating 29 such as $SiO_2$ to prevent drain line 17 from contacting conductive layer 7. Each gate line 17 and transistor 19 are coated in a similar manner (this film is not separately shown).

In a preferred configuration, the interval between adjacent drain lines 15 and adjacent gate lines 17 is about 20 to 70 μm and each detection element has an area of approximately 400–2000 μm$^2$. This ensures that relatively small elevation changes in the lower surface of conductive layer 7, on the order of 50 μm, can be detected by contact plates 23. Contact plates 23 can be any appropriate size, as long as they fit within each detection element. In the preferred embodiment, contact plates 23 comprise a substantial portion of area 20 (as shown in FIG. 2) so that surface elevation changes do not occur between adjacent contact plates 23, where they would not be detected.

Each transistor 19 has a drain terminal D coupled to a connection tab 31 of one of the drain lines 15 and a gate terminal G coupled to a connection tab 33 of one of the gate lines 17. Transistor 19 further includes a source terminal S connected to contact plate 23 so that the contact plate is electrically coupled to gate lines 15 and drain lines 17. When contact plate 23 is grounded, a current proportional to the degree of contact between contact plate 23 and conductive layer 7 will flow through drain terminal D of transistor 19 to drain line 15 as is discussed below.

It should be noted that the invention is not limited to the configuration described above and shown in FIGS. 1–3. For example, electrode lines 15, 17 could be oriented at angles other than 90° with respect to each other. In addition, electrode lines 15, 17 can have larger or smaller intervals between adjacent lines, if desired.

The pressure surface input panel of the present invention is particularly suitable for detecting a fingerprint pattern on the inside surface of a fingertip F. To accomplish this, input panel 1 is connected to an electric circuit 41, as shown in FIG. 4. The entire electric circuit can be formed on plate 11 or circuit base plate 5 can be connected to a separately formed circuit with connectors (not shown). Conductive layer 7 of pressure sheet 3 is grounded via a resistor 43. Drain lines 15 of circuit base plate 5 are connected to an X register 45 via resistors R and gate lines 17 are connected to a Y register 47. X and Y registers 45, 47 drive electrode drain and gate lines 15, 17, respectively. A detector 49 is coupled to each drain line 15 at detection points $D_1$, $D_2$, $D_3$, . . . to sense the potentials at the detection points.

When fingertip F is pressed onto surface pressure input panel 1, pressure sheet 3 deflects downwardly towards circuit base plate 5. Conductive layer 7 generally conforms to the contour of the inside surface of fingertip F. Because the ridge and groove portions of fingertip F have different surface elevations, different pressing forces will act on conductive layer 7. Thus, depending on the amount of pressure and the resulting deflection of the portion of pressure sheet 3, the area of each contact plate 23 touched by conductive layer 7 will vary and some of the plates 23 may not be touched at all. For example, a relatively large portion of a plate located immediately under or near a ridge portion of the fingertip F will be touched by conductive layer 7. On the other hand, a relatively small portion (or none at all) of the a plate located immediately under or near a groove portion of fingertip F will be brought into contact with conductive layer To detect the degrees of contact between conductive layer 7 and the contact plates 23, Y register 47 sequentially applies scanning signals to gates lines 17 at a predetermined timing or frequency. Simultaneously, X register 45 applies scanning signals to drain lines 15 at a predetermined timing or frequency. Preferably, X register 45 will cycle through all drain lines 15 while a potential is applied to a given gate line 17 to sequentially converge the X and Y signals at intersections points 25 along the given gate line. This process is repeated for each gate line 17 so that detector 49 can determine the relative location of the electrical signals generated by contact plates 23. It should be noted that this procedure can be reversed (i.e. Y register 47 cycles through each gate line 17 while a potential is applied to a given drain line 15).

The current flowing from X register 45 generates a reference potential across each resistor R that can be detected by detector 49 at each detection point D. When conductive layer 7 contacts a portion of a given contact plate 23, source terminal S of the corresponding transistor 19 is grounded via the contact plate 23, conductive layer 7 and resistor 43. When the X and Y signals converge onto the corresponding intersection point 25, transistor 19 turns ON and when film 7 touches the contact plate, a drain current flows along drain line 15 to ground, thereby changing the potential at the corresponding detection point D and generating a detectable electrical signal. This change in potential is generally proportional in an analog manner to the size of the area of contact plate 23 that has been touched by conductive layer 7. Detector 49 uses conventional signal processing to determine the potential at every intersection point 25 so that a surface pressure differential, corresponding to the fingerprint pattern of fingertip F, can be computed and the sensed fingerprint can be reproduced.

Figure 5:
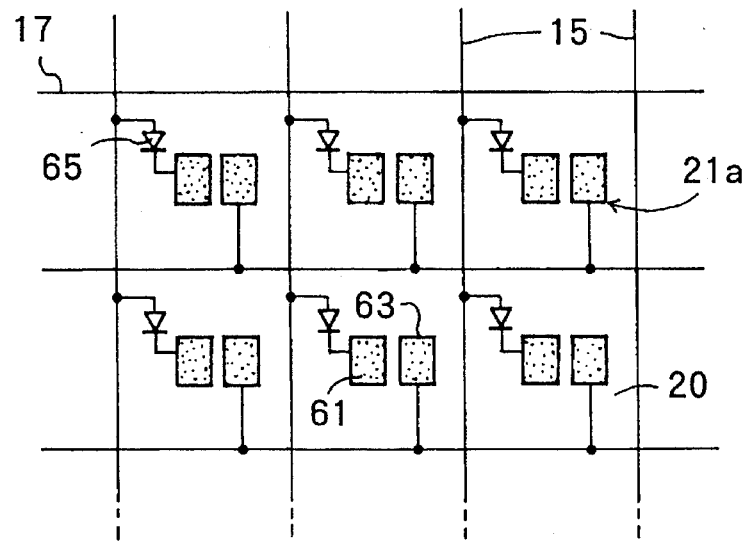
FIG. 5 is a top view of a portion of the circuit base plate of an alternative embodiment of the surface pressure input panel of FIG. 1.
Figure 6:
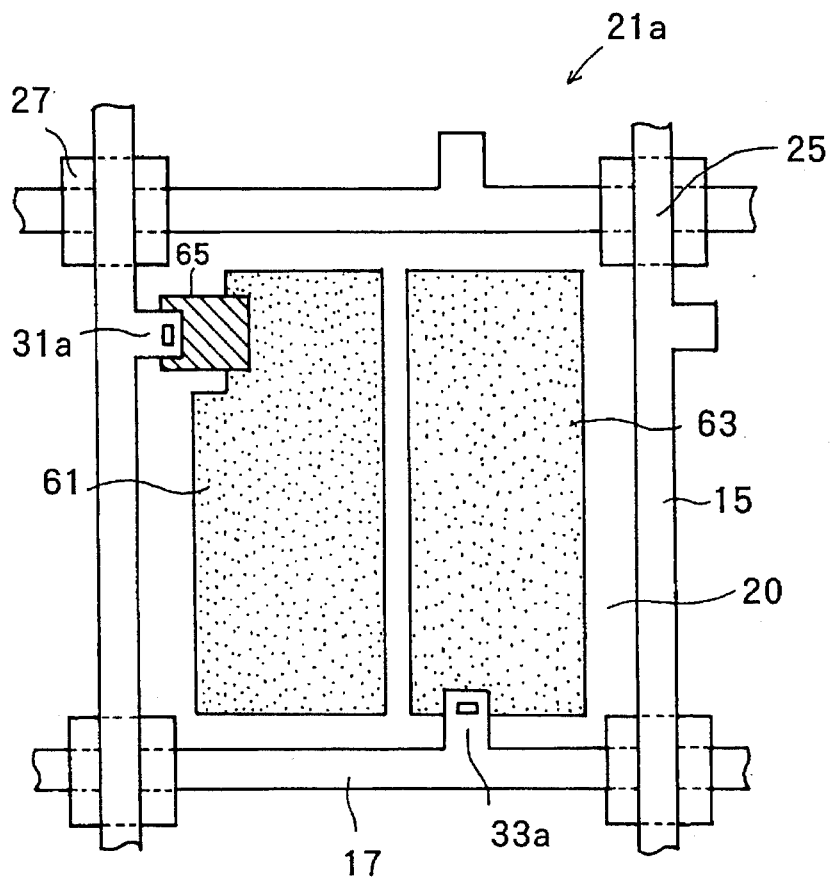
FIG. 6 is an enlarged view of a detection element of the circuit base plate of FIG. 5.
Figure 7:
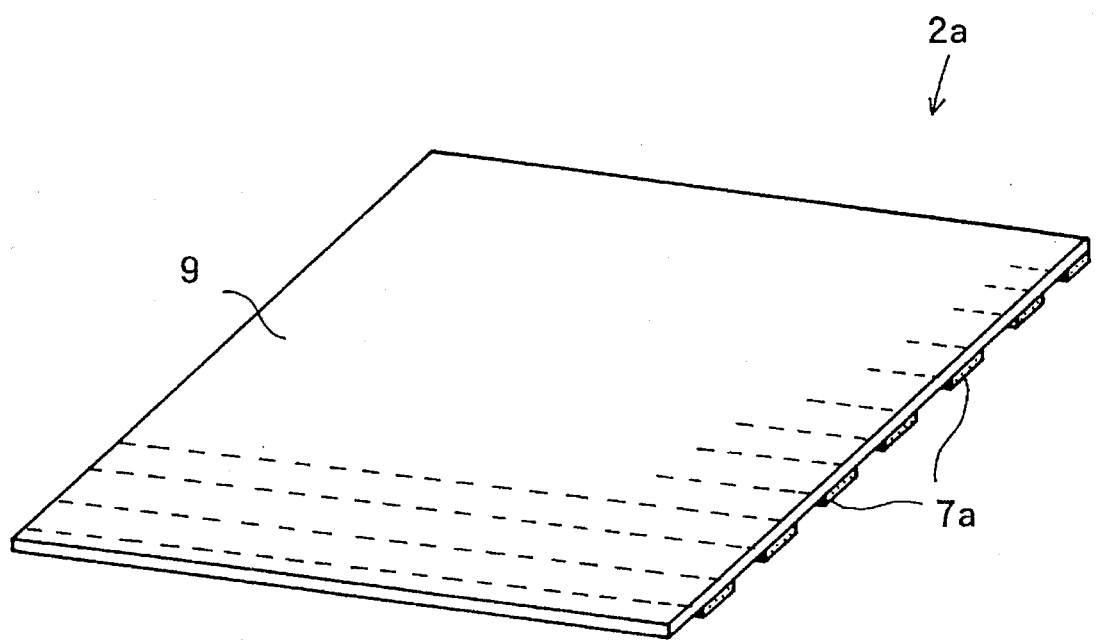
FIG. 7 is a perspective view of a pressure sheet for the circuit base plate of FIG. 5.

Referring to FIGS. 5–7, an alternative embodiment of surface pressure input panel 1 uses detection elements 21a which include first and second contact plates 61, 63 and a thin-film diode 65. The first and second contact plates are formed within areas 20 between electrode lines 15, 17 and they are insulated from each other. The anode terminal of thin-film diode 65 is coupled to connection tab 31a of drain line 15 and the cathode terminal of diode 65 is connected to first plate 61 to electrically couple the first plate to drain line 15. Second plate 63 is directly coupled to connection tab 33a of gate line 17.

FIG. 7 illustrates an alternative pressure sheet 2a for use with the circuit base plate shown in FIG. 5. Pressure sheet 2a is formed by depositing generally rectangular-shaped conductive layer strips 7a which are spaced apart and extend along the lower surface of insulating film 9. Each conductive layer strip 7a is located immediately above a pair of contact plates 61, 63.

To detect a fingerprint pattern, a fingertip F is pressed onto pressure sheet 2a in the manner described above. Since first and second contact plates 61, 63 are located immediately under a corresponding conductive layer strip 7a of the pressure sheet, diode 65 is rendered conductive in the forward direction when the conductive strip touches a pair of first and second contact plates. As a result, the potential at the corresponding detection point D changes in the manner described above. When a groove portion of fingertip F is located above a pair of contact plates 61, 63, conductive layer 7 may not touch the contact plates. In such case, the potential at the corresponding detection point does not change. On the other hand, when a ridge portion of fingertip F is located immediately above a pair of contact plates 61, 63, a relatively larger area of the contact plates will be touched by conductive layer strip 7a and the potential at the detection point will undergo a corresponding larger change.

What is claimed is:

1. A surface pressure input panel comprising:
   a flexible thin film sheet having a conductive layer; and
   a circuit plate coupled to the thin film sheet and comprising an insulating base plate with a thin film formed thereon, the thin film comprising intersecting first and second groups of electrode lines, conductive contact plates associated with intersection points formed by the electrode lines and facing the conductive layer, and switches operatively coupling the contact plates with the associated electrode lines for generating electrical signals for contact plates that are touched by the conductive layer and applying the electrical signals to the first group of electrode lines so that the second group of electrode lines can be used for determining a relative location of each contact plate, the electrical signals representing contact resistance between the thin film sheet and the contact plates.

2. The input panel of claim 1 wherein the switches include thin film transistors.

3. The input panel of claim 2 wherein the transistors are polycrystal transistors and the insulating base plate comprises glass.

4. The input panel of claim 1 wherein each conductive contact plate comprises first and second plate segments insulated from each other, wherein the switches comprise a diode connected to one of the plate segments, the first and second plate segments being positioned so that pressure applied to the conductive layer electrically connects the plate segments.

5. The input panel of claim 1 wherein the electrical signal is an analog signal representing contact resistance generated by the conductive layer, the analog signal being generally proportional to an area of the contact plate that has been touched by the conductive layer.

6. The input panel of claim 5 wherein the flexible thin film sheet has a surface opposite the conductive layer adapted for receiving a fingertip, the fingertip having an inside surface with contours, the pressure layer being adapted to deflect generally in conformity with the contours when the inside surface of the fingertip is pressed onto the surface of the pressure sheet.

7. The input panel of claim 1 wherein the first and second groups of electrode lines form an x-y grid with a multiplicity of generally rectangular areas between the electrode lines, the contact plates covering a major portion of the rectangular spaces.

8. The input panel of claim 1 wherein the electrode lines of each group are substantially parallel and spaced approximately 20–150 μm from each other.

9. An apparatus for use in mapping physical surface irregularities of an object, the apparatus comprising:
   a thin film sheet adapted to deflect locally in substantial conformity with the surface irregularities when the object is pressed against a first side of the sheet, a second side of the sheet including an electrically conductive layer which deflects with the sheet;
   an insulating base plate facing the film;
   a multiplicity of electrically conductive plates carried by the base plate and located between the base plate and the film, the conductive surfaces being spaced from the film when overlying portions of the film are not subjected to pressure;
   means, carried on the base plate, for detecting an analog signal when pressure applied to the sheet causes respective overlying portions of the film to contact corresponding conductive surfaces; and means for use in determining the relative locations of the conductive surfaces;

whereby the surface irregularities can be mapped on the basis of the analog signals and the relative locations of the conductive surfaces.

10. The apparatus of claim 9 wherein the conductive plates are arranged in an x-y array.

11. The apparatus of claim 9 wherein each conductive plate comprises first and second plate segments electrically insulated from each other, wherein the signal generating means comprises a diode connected to one plate segment, the first and second plate segments being positioned so that pressure applied to the overlaying portion of the sheet electrically connects the plate segments.

12. The apparatus of claim 9 wherein the signal generating means comprises thin film transistors.

13. The apparatus of claim 9 wherein the signal generating means includes means for generating analog signals in response to pressure applied to the respective overlying portions of the film so that the generated signals are proportional, as analog signals to the applied pressure.

14. The apparatus of claim 9 wherein the means for use in determining the location comprises first and second groups of electrically conductive lines which intersect each other, and means for insulating the lines of the first group from the lines of the second group.

15. The apparatus of claim 14 wherein the first and second groups of lines are substantially perpendicular with respect to each other and define an x-y grid of lines.

16. An apparatus for use in mapping physical surface irregularities of an object, the apparatus comprising:

a touch panel including a thin film sheet adapted to deflect locally in substantial conformity with the surface irregularities when the object is pressed against a first side of the sheet, a second side of the sheet including an electrically conductive layer which deflects with the sheet, an insulating base plate attached to the sheet and comprising intersecting first and second groups of electrode lines forming intersection points where the electrode lines cross, conductive contact plates associated with the intersection points and facing the conductive layer, and analog switches operatively coupling the contact plates with the electrode lines associated with the contact plates for generating an analog current when electric potentials are applied to corresponding electrode lines of the first and second groups, the analog switches applying the analog current to the first group of electrode lines when the contact plates are touched by the conductive layer;

first and second registers, coupled to the first and second groups of electrode lines, respectively, for applying an electric potential to the first and second groups of electrode lines; and a detector operatively coupled to the first and second groups of electrode lines for sensing the electric signals in the first group of lines and determining the locations of the contact plates to thereby enable a reconstitution of the surface irregularities of the object.

17. The apparatus of claim 16 wherein the switches comprise thin film transistors.

18. The apparatus of claim 16 wherein the switches comprise diodes.

19. A method for detecting a fingerprint pattern from a fingertip comprising the steps of:

providing a flexible pressure sheet with a conductive layer coupled to a circuit base plate, the circuit base plate having a multiplicity of contact plates facing the conductive layer;

pressing the fingertip against the conductive layer such that the conductive layer generally conforms to contours of the fingertip and touches a group of the contact plates;

generating an analog signal from each contact plate that has been touched by the conductive layer, the analog signal being proportional to an area of each contact plate touched by the conductive layer;

detecting the electrical signals; and determining a relative location of the contact plates;

whereby the fingerprint pattern can be recreated by correlating the electrical signals with the location of the contact plates.

* * * * *